United States Patent Office 3,363,433
Patented Jan. 16, 1968

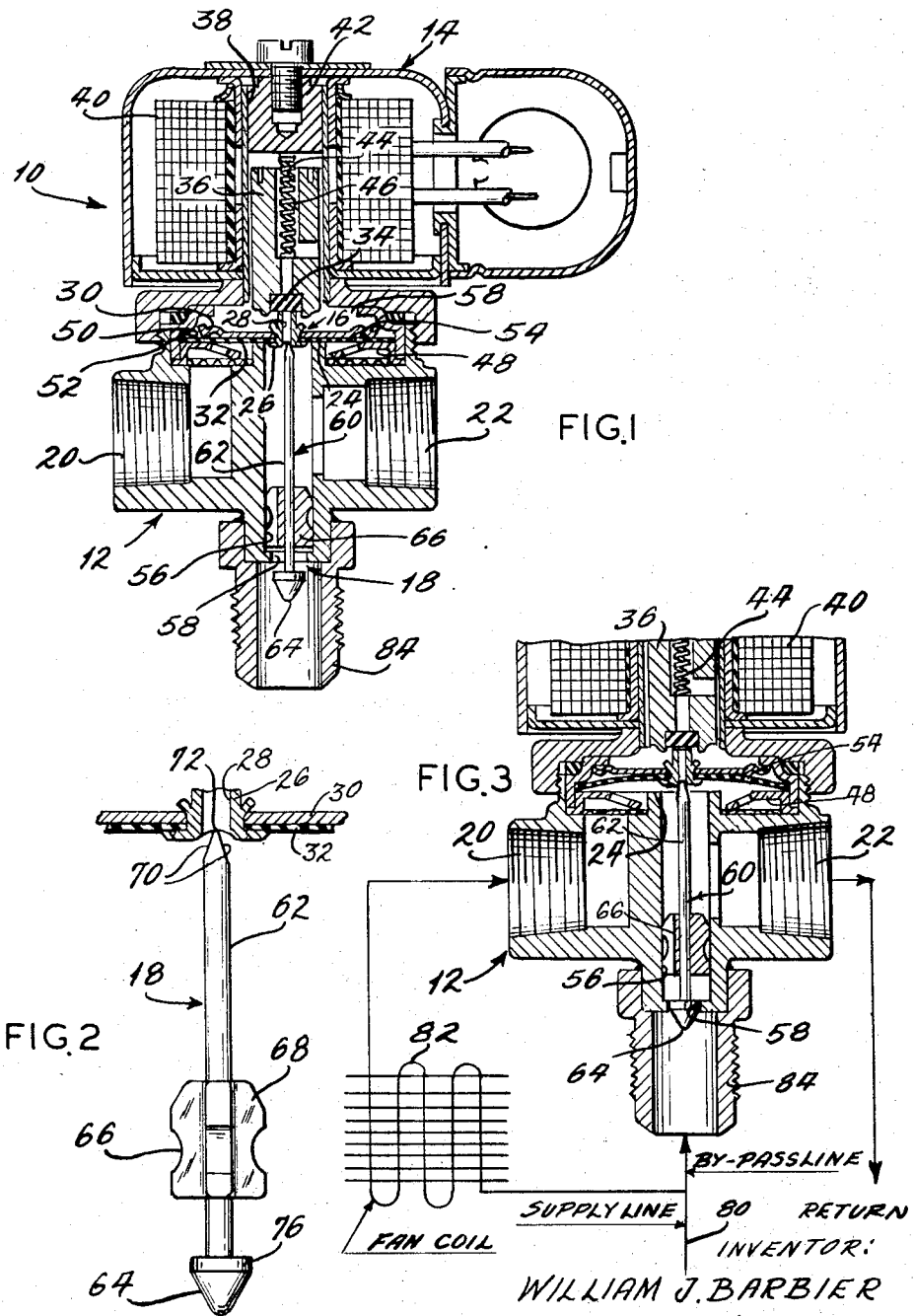

3,363,433
PILOT OPERATED CONTROL VALVE
William J. Barbier, Overland, Mo., assignor to Jackes-Evans Manufacturing Company, St. Louis, Mo., a corporation of Missouri
Filed Aug. 27, 1965, Ser. No. 483,184
13 Claims. (Cl. 62—197)

Many control valves are in existence and are used to control and regulate flow including flow through heat exchangers such as are used in refrigeration, air conditioning and heating systems and the like. For the most part, the known valves are on-off devices or metering devices which either prevent or limit flow in the system, but so far as known it has not heretofore been proposed to provide such a valve with by-pass connection means to allow flow to continue in a system under all conditions even when the device or system in which the valve is used is in an off or non-operating cycle. Furthermore, it has not been proposed to control the by-pass means by an operative connection with the same valve control means that control flow through the heat exchanger operated thereby.

The subject valve is an improvement over the valves disclosed in Vargo Patents Nos. 2,738,157; 2,870,986 and 2,940,722 which are owned by applicant's assignee, and add thereto a by-pass control feature which improves the operating characteristics of the system in which it is installed by maintaining the system in pressure balance and reducing pressure extremes. This is particularly desirable in systems having more than one heat exchanger operating off the same source and where each heat exchanger is individually controlled. The present valve construction therefore overcomes these and other shortcomings and limitations of known devices used for the same or similar purposes by including by-pass means in a pilot operated valve to enable fluid to flow in the system even when the valve is in closed condition. The subject valve comprises a structure having an inlet, and outlet, means for controlling communication between the inlet and outlet, a bypass inlet, and means under control of the aforesaid control means for controlling communication between the by-pass inlet and said outlet such that the by-pass communicates with the outlet when the inlet and outlet are out of communication.

It is a principal object of the present invention to provide improved valve means for systems having heat exchangers and the like.

Another object is to provide improved means for regulating systems having one or more heat exchangers, which means maintains the system pressures more nearly in balance.

Another object is to provide relatively inexpensive pilot operated control valve means which are particularly suitable for controlling and regulating refrigeration, air conditioning and heating systems.

Another object is to improve the performance and operating characteristics of systems employing heat exchangers and the like.

Another object is to enable greater numbers of heat exchanger units to be operated by the same pump.

Another object is to reduce the cost and complexity of refrigeration, air condition and similar systems.

Another object is to provide means for more precisely and more accurately controlling the operating characteristics of heat conversion equipment.

Another object is to provide control means for refrigeration, air conditioning and heating systems which can be installed as original equipment or added to existing systems.

Another object is to stabilize the loads on pumps, compressors and like devices.

Another object is to provide relatively trouble free control valve means which can be installed by persons having little or no skill or training.

These and other objects and advantages of the present invention will become apparent after considering the following detailed specification covering a preferred embodiment of the device in conjunction with the accompanying drawing, wherein:

FIG. 1 is a cross-sectional view taken through the center of a valve constructed according to the present invention, said valve being shown in deenergized condition;

FIG. 2 is an enlarged fragmentary view partly in section at a movable by-pass valve member employed in the subject device; and FIG. 3 is a fragmentary cross-sectional view of the same valve shown in its energized condition and also illustrating schematically its connections into a system controlled thereby.

Referring to the drawing more particularly by reference numbers, the number 10 refers to a valve constructed according to the present invention. The valve 10 includes a main housing portion 12, a solenoid control portion 14, an amplifier assembly 16, and by-pass valve means 18. The structural details of the solenoid control portion 14 and the amplifier assembly 16 may be similar to the details of the corresponding portions of the valve structures disclosed in Vargo Patents Nos. 2,738,157, 2,870,-986, and 2,940,722 assigned to the same assignee. These portions also operate similarly to the patented constructions.

The main valve housing 12 has an inlet 20, an outlet 22 and a valve seat 24 positioned therebetween. The amplifier assembly 16 cooperates with the valve seat 24 to control communication between the inlet 20 and the outlet 22. The amplifier assembly 16 is pilot operated and includes a central support portion 26 with a pilot port 28 therethrough. An annular plate-like member 30 is mounted on the support member 26 and extends radially outwardly therefrom. A flexible resilient diaphragm 32 is also mounted on the hub portion 26 adjacent to the plate-like member 30 and engages the valve seat 24 when the valve is closed to prevent communication between the inlet 20 and outlet 22. This is the deenergized condition of the valve. In the deenergized condition, the pilot port 28 is also closed by solenoid means including a resilient member 34 mounted at the lower end of a movable armature 36. The armature 36 moves in a tube 38 which extends through a solenoid coil 40 positioned in the solenoid control portion 14. The upper end of the tube 38 is closed by a plug 42, and a spring 44 has one end positioned in abutment with the plug 42 and its opposite end extending into a bore 46 in the armature 36 to bias the armature into the deenergized position shown in FIG. 1 to block the pilot port 28.

The lower surface of the diaphragm 32 is supported by an annular support member 48 which is fixedly positioned in the housing. The support member 48 has a plurality of spaced holes or openings through it to enable the inlet 20 and the outlet 22 to communicate when the valve is in its open condition. The edge of the diaphragm 32 is unattched and is positioned between two spaced annular surfaces or shoulders 50 and 52. In the deenergized position of the diaphragm it engages the shoulder 52 and in the energized position it engages the shoulder 50. The shoulders 50 and 52 can be parallel to each other or they can be angularly related or even rounded as shown. The diaphragm also has an equalizer orifice 54.

Of particular importance to the subject construction is the provision of a by-pass inlet 56 and control means 18 therefor. The by-pass inlet 56 is shown as being a cylindrical bore which communicates at one end with the outlet 22 and at the opposite end with a valve seat 58, which for illustrative purposes is shown as a slide valve seat. A second valve assembly 60 is slidably positioned in the cylindrical bore 56 and includes a rod 62 with a valve member 64 mounted on the lower end and a guide member 66 mounted at an intermediate location to slidably cooperate with the cylindrical bore 56. The guide member 66 is formed by a plurality of fins 68 to allow fluid flow thereby. The upper end of the rod 62 is defined by two opposite beveled surfaces 70 which together form a diametral edge 72 with two points at the ends. The points thus formed are engaged by the hub portion 26 of the amplifier assembly 16 when the valve is deenergized and this causes the valve assembly 60 to be moved downwardly in the bore 56 to open the slide valve seat 58. The construction of the upper end of the rod is designed to prevent blocking of the pilot port 28 which could change the operating characteristics of the valve. The upper end of the rod 62 can also have other shapes and can even be formed to engage the amplifier assembly 16 at different locations without changing the nature of the invention. For example, the upper end of the rod could be split into two or more tines to engage the amplifier member outwardly of the pilot port or a separate piece could be attached to the rod to engage the amplifier assembly without blocking the pilot port.

The valve member 64 is attached to the lower end of the rod 62 and is shown as being generally cone shaped and having a cylindrical portion 76 which cooperates with the valve seat 58 in the energized condition of the valve.

A typical system in which the subject valve is used is illustrated schematically in FIG. 3 and includes a supply line conduit 80 from a pump or like device which is connected to a heat exchanger 82 and to a fitting 84 which communicates with the by-pass inlet 56 through the valve seat 58. The outlet side of the heat exchange 82 is connected to the valve inlet 20, and the valve outlet 22 is is connected to the return side of the pump. When the heat exchanger is operating the valve 10 is in its energized condition and refrigerant or other fluid flows through the valve between the inlet 20 and the outlet 22. At this time the by-pass valve is closed as aforesaid. This means that substantially all of the fluid from the pump passes through the heat exchanger 82 and very little, if any, passes through the by-pass valve means. When it is desired to prevent fluid flow through the heat exchanger, however, the valve 10 will be deenergized and the amplifier assembly will move into engagement with the valve seat 24. When this happens, the amplifier assembly 16 will move the by-pass valve assembly 60 downwardly to open the by-pass valve. The fluid from the outlet side of the pump will now flow through the valve between the by-pass port 56 and the outlet 22 and will by-pass the heat exchanger 82. This is desirable because it stabilizes the pressure in the system and prevents pressure surges and build-ups which might effect other parts of the system. This is particularly advantageous in systems having a plurality of heat exchangers operated by the same pressure source.

There has thus been shown and described a novel control valve construction which fulfills all of the objects and advantages sought therefor. Many changes, modifications, variations, and other uses and applications of the valve will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A pilot operated control valve comprising a housing having first and second inlets and an outlet, first valve means for controlling communication between the first inlet and the outlet, second valve means for controlling communication between the second inlet and the outlet, means for controlling the first valve means to move between an open position allowing communication between the first inlet and the outlet and a closed position preventing said communication, means on said second valve means rigidly engageable by said first valve means for moving the second valve means to an open position whenever the first valve means moves to a closed position, said second valve means being free to seek a position substantially entirely controlled by the pressure differential that exists between the second inlet and the outlet whenever the first valve means moves to an open position.

2. The pilot operated valve defined in claim 1 wherein said second valve means include a valve seat positioned between the second inlet and the outlet, and a movable assembly, said movable assembly having a valve portion cooperatively engageable with said second valve seat and a rigid operator portion engageable with the first valve means.

3. The pilot operated valve defined in claim 2 wherein said operator portion includes means that make substantially point contact with the first valve means.

4. The pilot operated valve defined in claim 1 including means normally urging said first valve means into closed condition to prevent communication between the first inlet and the outlet, the closed condition of said first valve means moving the second valve means into an open position.

5. The pilot operated valve defined in claim 1 wherein the means on the second valve means engageable with the first valve means include a lost motion connection.

6. A pilot operated valve for refrigeraiton systems and the like comprising a valve housing having a first inlet, a second inlet, and an outlet, first valve means controlling communication between the first inlet and the outlet, second valve means for controlling communication between the second inlet and the outlet, and a lost motion connection between the first and second valve means, said lost motion connection including means on the second valve means rigidly engageable with the first valve means to cause the second valve means to move to an open position establishing communication between the second inlet and the outlet whenever the first valve means moves to a closed condition preventing communication between the first inlet and the outlet, said second valve means being released by the first valve means whenever the first valve means move to open position, said freed second valve means moving to a position substantially entirely controlled by the pressure differential that exists between the second inlet and the outlet.

7. Valve means comprising a housing having a chamber with an inlet, an outlet and a valve seat positioned therebetween, spaced opposed peripheral shoulders formed in the chamber, a valve assembly movably positioned within the chamber including a support portion and a flexible diaphragm mounted thereon, said valve assembly being movable in the chamber between an open positioned spaced from the valve seat in which position said diaphragm engages one of said chamber shoulders and a closed position in which the diaphragm engages the other spaced shoulder, a pilot port through the movable valve assembly in communication with the outlet, and an equalizer orifice through the valve assembly of less capacity than the pilot port assembly and in communication with the inlet, means for controlling communication through the pilot port, a second inlet in the valve housing including passage means connected between said second inlet and the outlet, and valve means in said passage means for controlling communication between the second inlet and the outlet, said valve means including a second valve seat positioned in the passage means and a second movable valve member cooperatively engageable with said second valve seat, said second movable valve member having a rigid operator portion engageable with the said valve assembly adjacent to the pilot port, said valve assembly moving said second movable valve member to an open position whenever the valve assembly moves to a closed position engaging the valve seat, said second movable valve member being released by said valve assembly to move to a position relative to the second valve seat substantially entirely controlled by the pressure differential existing between the pressure at the second inlet and pressure at the outlet whenever the valve assembly moves to its open position.

8. The valve means defined in claim 7 wherein the said second movable valve member has a rod member with a valve portion thereon for cooperating with the second valve seat, said rod member extending to engage the aforesaid movable valve assembly, and means for guiding the movements of said second valve assembly.

9. The means defined in claim 8 wherein the rod member engages the valve assembly adjacent to the pilot port.

10. In a valve housing having an inlet and an outlet adapted to be connected to fluid conduits, a chamber positioned to provide fluid flow communication between the inlet and the outlet, said chamber having a first valve seat associated with the outlet, a pair of spaced and opposed peripheral shoulders formed in the chamber outwardly of said valve seat, an amplifying member positioned in the chamber and movable between an open position away from the first valve seat and engaged with one of said peripheral shoulders and a closed position in which the amplifying member cooperates with the first valve seat and with the other peripheral chamber shoulder, a second inlet in the valve housing including a second valve seat positioned between said second inlet and the outlet, and a movable valve member for cooperating with said second valve seat, said valve member having a rod portion thereon that extends therefrom to adjacent the first valve seat for engagement by the amplifying member, said amplifying member engaging and moving the rod portion and the valve member connected thereto to an open position whenever the amplifying member moves to a closed position, said valve member being free to move relative to said second valve seat substantially entirely under control of the pressure differential that exists between the pressure at the second inlet and the pressure at the outlet whenever the amplifying member moves to its open position.

11. In combination, a valve housing containing a cylindrical chamber, an inlet and outlet into the chamber, a valve seat associated with the outlet, spaced axially opposed shoulders in the chamber, an implifying member positioned within the chamber and having free limited axial and lateral movement relative to the housing, said amplifying member being movable between an open position away from the valve seat and a closed position engaged with the valve seat, said amplifying member having a flexible disc-like portion which extends outwardly to between the chamber shoulders for selectively making sealing engagement therewith, a pilot port through the amplifying member having one end in communication with the outlet, an equalizer orifice through the amplifying member of lesser flow capacity than the pilot port in communication with the inlet, a by-pass inlet in the valve housing, a second valve seat positioned between the by-pass inlet and the outlet, and a by-pass valve member having an elongated portion rigidly engageable with the amplifying member and movable in response to predetermined movements thereof, said by-pass valve member being moved by the amplifying member to an open position spaced from the second valve seat in response to movements of the amplifying member toward a closed condition, said by-pass valve member being released and free to move toward a closed position under control of the pressure differential that exists between the by-pass inlet and the outlet whenever the amplifying member moves to the open position.

12. In combination, a refrigeration system comprising a heat exchanger having an inlet and an outlet, a fluid pressure source having a low pressure inlet and a high pressure outlet, the improvement comprising control valve means including valve housing having a first inlet, a second inlet, and an outlet, first valve means controlling communication between the first inlet and the outlet, second valve means for controlling communication between the second inlet and the outlet, and a lost motion connection between the first and second valve means, said lost motion connection causing the second valve means to be moved by the first valve means to an open position establishing communication between the second inlet and the outlet whenever the first valve means move to a closed condition preventing communication between the first inlet and the outlet, said second valve means moving to a closed position in response to pressure in the second inlet whenever the first valve means are in open position, the high pressure outlet of the fluid pressure source being connected to the second inlet of the said valve housing and the inlet of the heat exchanger, the outlet of the heat exchanger being connected to the first inlet of said valve housing, and the outlet of the valve housing being connected to the low pressure inlet to the pressure source.

13. In combination, in a refrigeration system, a valve having a valve housing containing a cylindrical chamber, an inlet and outlet into the chamber, a valve seat associated with the outlet, spaced axially opposed shoulders in the chamber, an amplifying member positioned within the chamber and having free limited axial and lateral movement relative to the housing, said amplifying member being movable between an open position away from the valve seat and a closed position engaged with the valve seat, said amplifying member having a flexible disc-like portion which extends outwardly to between the chamber shoulders for selectively making sealing engagement therewith, a pilot port through the amplifying member having one end in communication with the outlet, an equalizer orifice through the amplifying member of lesser flow capacity than the pilot port in communication with the inlet, a by-pass inlet in the valve housing, a second valve seat positioned between the by-pass inlet and the outlet, and a by-pass valve member engageable with the amplifying member and movable in response to predetermined movements thereof, said by-pass valve member moving to an open position relative to the second valve seat in response to movements of the amplifying member toward a closed condition, a heat exchanger having an inlet and an outlet, a pump having an inlet and an outlet, a connection between the outlet of the pump and the by-pass inlet to the valve housing and to the inlet of the heat exchanger, another connection between the outlet of the heat exchanger and the inlet to the valve housing, and a third connection between the outlet to the valve housing and the inlet to the said pump.

References Cited
UNITED STATES PATENTS

| | | | |
|---|---|---|---|
| 2,940,722 | 6/1960 | Vargo | 251—30 |
| 2,985,193 | 5/1961 | Clack | 137—630.22 |
| 2,986,899 | 6/1961 | Schenk. | |
| 2,997,063 | 8/1961 | Anderson | 137—607 |
| 3,030,981 | 4/1962 | Chatham | 137—607 X |

MEYER PERLIN, *Primary Examiner.*